United States Patent [19]
Tanaka et al.

[11] Patent Number: 5,133,031
[45] Date of Patent: Jul. 21, 1992

[54] OPTICAL SHUNT DEVICE

[75] Inventors: Toshiyasu Tanaka, Yokohama; Toyohiro Kobayashi; Shouji Mukohara, both of Shizuoka, all of Japan

[73] Assignees: Du Pont Opto Electronics Kabushiki Kaisha, Yokohama; Mitsubishi Denki Kabushiki Kaisha, Tokyo, both of Japan

[21] Appl. No.: 465,230
[22] PCT Filed: Jul. 12, 1989
[86] PCT No.: PCT/JP89/00702
  § 371 Date: Feb. 22, 1990
  § 102(e) Date: Feb. 22, 1990
[87] PCT Pub. No.: WO90/00838
  PCT Pub. Date: Jan. 25, 1990

[30] Foreign Application Priority Data

Jul. 13, 1988 [JP] Japan ................ 63-174163
Jul. 13, 1988 [JP] Japan ................ 63-174164

[51] Int. Cl.$^5$ ............................................. G02B 6/28
[52] U.S. Cl. .................................. 385/44; 385/24
[58] Field of Search .............. 350/96.15, 96.16; 455/610, 612; 385/42, 44; 359/173, 188, 195

[56] References Cited

U.S. PATENT DOCUMENTS

| | | | |
|---|---|---|---|
| 4,072,399 | 2/1978 | Love .................... | 350/96.16 |
| 4,112,293 | 9/1978 | Käch .................... | 350/96.16 X |
| 4,234,968 | 11/1980 | Singh ................... | 455/607 |
| 4,671,608 | 6/1987 | Konishi ................. | 350/96.16 |
| 4,732,446 | 3/1988 | Gipson et al. ........... | 350/96.15 |
| 4,909,585 | 3/1990 | Kobayashi et al. ........ | 350/96.16 |

FOREIGN PATENT DOCUMENTS 0014634 8/1980 European Pat. Off. .
8508153 6/1985 Fed. Rep. of Germany .

Primary Examiner—Frank Gonzalez
Attorney, Agent, or Firm—Oblon, Spivak, McClelland, Maier & Neustadt

[57] ABSTRACT

An optical shunt device in which a pair of connecting ends (22, 23) for being connected to optical communication fiber sections (11) are divided into three systems. The first of the three systems is a passing-through light conduction path (19) through which light signals in two opposite directions are allowed to pass through between the connecting ends. The second of the three systems is a receiving light conduction path (20) having a first light-receiving end (20a) and a second light-receiving end (20b) each receiving a light signal from the connecting ends (22, 23). The third light path (21) has a first light-transmitting end (21a) and a second light-transmitting end (21b) each transmitting a light signal to the connecting ends. The optical shunt device also comprises a photo-electric conversion unit (B) including a light-receiving element (13) disposed at the first and second light-receiving ends (20a, 20b) for receiving a light signal from the first light-receiving end (20a) and the second light-receiving end (20b) of the second light path (20) and converting it into an electric signal, an amplifier circuit (14) for amplifying the electric signal from the light-receiving element (13), and a light-emitting element (17) disposed at the first and second light-transmitting ends (21a, 21b) for converting the electric signal into an optical signal to supply the optical signal to the first and second light-transmitting ends.

3 Claims, 9 Drawing Sheets

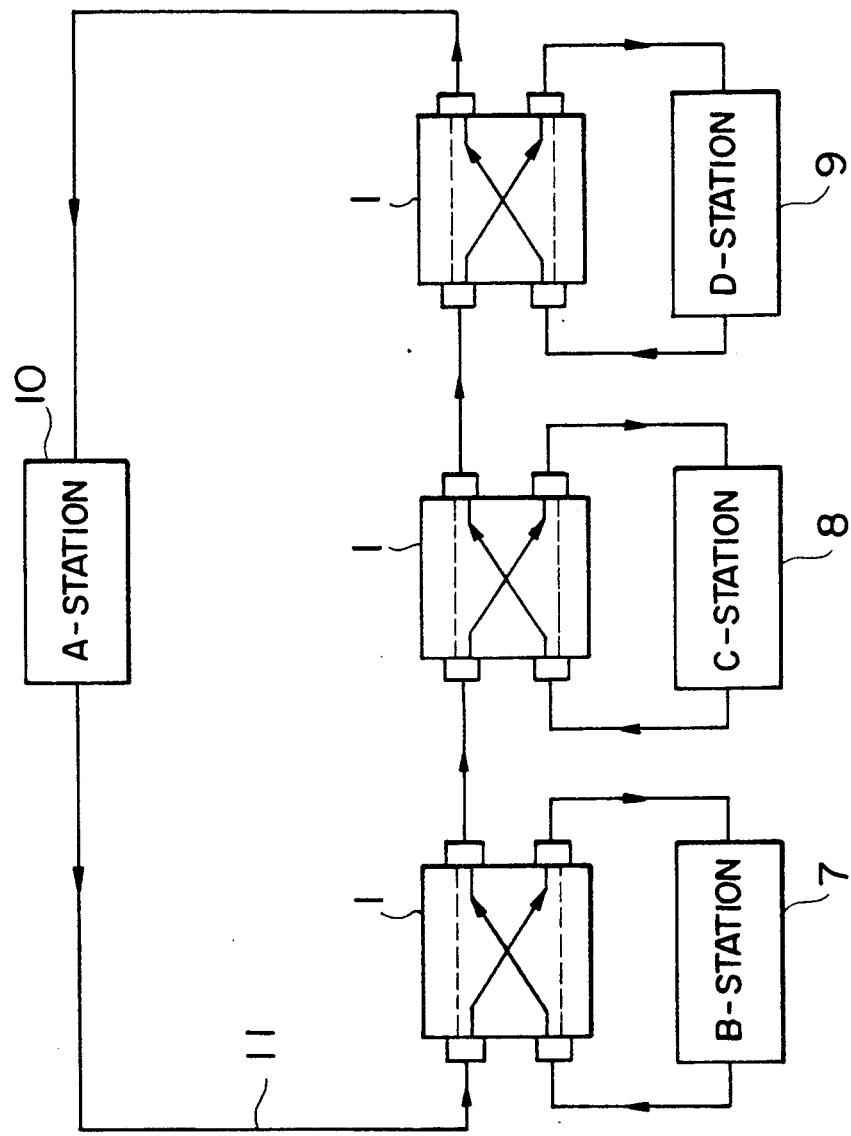

F I G. 8
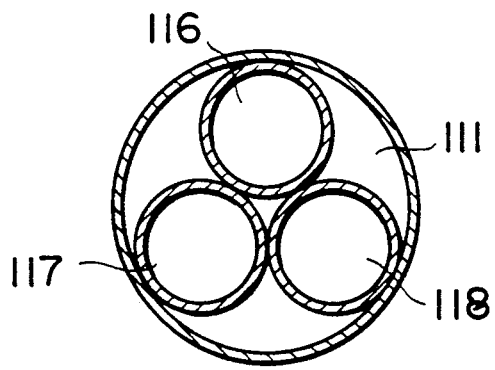
F I G. 9
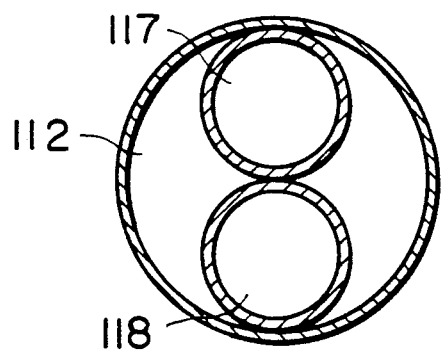
F I G. 10
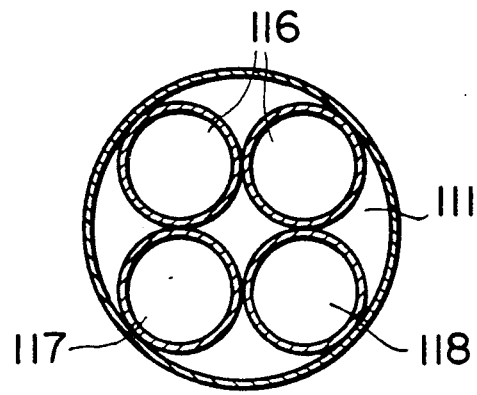

5,133,031

OPTICAL SHUNT DEVICE

TECHNICAL FIELD

This invention relates to an optical shunt device and more particularly to an optical shunt device in which bidirectional optical transmission and reception through a single optical fiber is possible.

BACKGROUND ART

FIG. 1 illustrates a conventional optical shunt device for an optical communication system disclosed in Japanese Patent Laid-Open No. 62-73225 light, in which FIG. 1a shows a state in which a prism is inserted into a light path and FIG. 1b shows a state in which the prism is moved out of the light path. FIG. 2 is a schematic diagram illustrated a conventional light transmitting system.

Hereinafter, "communication node" means a shunt device or a shunt station and may be simply referred to as "station".

In FIG. 1, reference numeral (1) designates an optical switch for changing a light path through which an optical signal is supplied, (2) is a highly transparent optical prism movably mounted in the optical switch (1). The transparent prism (2) is inserted into the light path so that, when any of the stations of the system fails, the optical signal is allowed to pass through that particular station. (3) and (4) are up light-input end and down light-input end of the optical switch (1), respectively, (5) and (6) are down light-output end and up light-output end of the optical switch (1), respectively.

In FIG. 2, (7) to (10) are communication systems (stations), wherein (7) is B-station, (8) is C-station, (9) is D-station and (10) is A-station. (11) is an optical fiber for transmitting a light signal.

The conventional optical communication system is constructed as above described, and the optical switch (1) employing the transparent prism (2) as a dividing communication unit of the optical communication system. The operation of this will be described below.

The light incoming into the up light-input end (3) of the optical switch (1) passes through the transparent prism (2) and exits from the down light-output end (5) (See FIG. 1(a)). This light passes through the B-station (7) of FIG. 2, for example, enter into the down light-input end (4) again and, after passing through the transparent prism (2), transmitted from the up light-output end (6) to the optical switch (1) of the C-station (8) which is the next station. In this manner the light signal from the A-station (10) is transmitted to the D-station (9) through the optical fiber (11) and successively through the respective stations. In normal operation, the B-station (7), the C-station (8) and the D-station (9) each amplifies the light signal to compensate for the attenuation of the light signal due to the absorption and the scattering of light within the light path.

If a failure occurs in either of the above stations, the transparent prism (2) in the optical switch (1) of that particular station is moved by a drive unit (not shown) to allow the light entered into the up light-input end (3) of the optical switch (1) to directly emit from the up light-output end (6) (see FIG. 1(b)). Thus, the light is transmitted to the next normal station without being shunted or amplified.

Thus, in the conventional system, a loop comprising the A-station (10)→the B-station (7)→the C-station (8)→the D-station (9)→the A-station (10) in which the light signal is transmitted in one way is formed.

In the conventional optical communication system as above described, when a fault occurs in any of the stations connected to construct an optical transmission system, the light signal is transmitted to the next station by allowing it to pass through that particular station by the optical switch (1).

However, in the conventional system of this kind, an optical transparent prism (2) which is expensive and difficult to mass-produce is used in the optical switch (1) which is a dividing communication element of the optical communication system.

Also, it is necessary to connect each station to form a one-way loop in order to construct the optical transmission system, so that a directionality is required in the light signal transmission direction.

Further, when a fault occurs in any of the stations, a drive mechanism for moving the transparent prism (2) is neccessary, making the system itself expensive and large-sized.

Therefore, in the optical communication system of this kind, an optical shunt communication system of a simple structure which does not use expensive optical transparent prisms and yet capable of transmitting and receiving the light signals in either directions is desired to be developed.

DISCLOSURE OF THE INVENTION

Accordingly, the present invention has been made in order to solve the above problems and has as its object the provision of an optical shunt device capable of bidirectional optical communication and even when a fault occurs in any of the stations that particular station is passed-through so that the light signal can be transmitted to the next station.

Another object of the present invention is to provide an optical shunt device capable of bidirectional optical communication and even when a fault occurs in any of the stations that particular station is passed-through so that the light signal can be transmitted to the next station and there is no need for forming the connection between the stations in the system into loops.

With the above objects in view, as will be evident from FIG. 3 the optical shunt device in which a pair of connecting ends (22, 23) for being connected to optical communication fiber sections (11) are divided into three systems. The first of the three systems is a passing-through light conduction path (19) through which light signals in two opposite directions are allowed to pass through between the connecting ends. The second of the three systems is a receiving light conduction path (20) having a first light-receiving end (20a) and a second light-receiving end (20b) each receiving a light signal from the connecting ends (22, 23). The third light path (21) has a first light-transmitting end (21a) and a second light-transmitting end (21b) each transmitting a light signal to the connecting ends. The optical shunt device also comprises a photo-electric conversion unit (B) including a light-receiving element (13) disposed at the first and second light-receiving ends (20a, 20b) for receiving a light signal from the fist light-receiving end (20a) and the second light-receiving end (20b) of the second light path (20) and converting it into an electric signal, an amplifier circuit (14) for amplifying the electric signal from the light-receiving element (13), and a light-emitting element (17) disposed at the first and second light-transmitting ends (21a, 21b) for converting the electric signal into an optical signal to supply the optical signal to the first and second light-transmitting ends.

In this embodiment, the section between the connecting ends (22), (23) for being connected to the optical communicating optical fibers (11) is divided into three systems including a passing-through light conduction path (19) through which light signals in two opposite directions are allowed to pass through between the connecting ends, a receiving light conduction path (20) having a first light-receiving end (20a) and a second light-receiving end (20b) each receiving a light signal from the connecting ends (22, 23), and a transmission light conduction path (21) having a first light-transmitting end (21a) and a second light-transmitting end (21b) each transmitting a light signal to the connecting ends, and the light signal from the first light-receiving end (20a) and the second light-receiving end (20b) of the receiving light conducting path (20) is converted into an electric signal by the light-receiving element (13), and this electric signal is amplified by the amplifier circuit (14) and converted into an optical signal by the light-emitting element (17) to supply the optical signal to the first and second light-transmitting ends (21a, 21b) of the transmitting light conduction path (21), so that the light signal transmitted through the optical fiber (11) which is a single line can be bidirectionally received and this light signal can be photo-electrically converted into an electric signal. Also, various electric signal can be bidirectionally transmitted as a light signal converted from an electric signal. Moreover, one part of the light signal can be transmitted through the passing-through light conduction path (19) to the next station.

According to another embodiment of the optical shunt device of the present invention, the optical shunt device has three connecting ends (113, 114 and 115) including a pair of connecting ends (113, 114) divided into three light conduction systems, and one connecting end (115) divided into two light conduction systems, for being connected to optical communication fiber sections (111, 112). The optical shunt device comprises a passing-through light conduction path (116) through which light signals in two opposite directions are allowed to pass through between the connecting ends devided into the three systems, a receiving light conduction path (117) having a first light-receiving end (117a) and a second light-receiving end (117b) each receiving a light signal from the connecting ends (113, 114) divided into the three systems, the receiving light conduction path (117) also having a third light-receiving end (117c) for receiving a light signal from one of the connecting ends divided into two systems, and a transmitting light conduction path (118) having a first light-transmitting end (118a) and a second light-transmitting end (118b) each transmitting a light signal to two of the connecting ends divided into the three systems, the transmitting light conduction path (118) also having a third light-transmitting end (118c) for transmitting a light signal to one of the connecting ends divided into the two systems. The optical shunt device also comprises an energy conversion unit (B) which includes a light-receiving element (119) disposed at the first, second and third light-receiving ends (117a, 117b, 117c) for receiving a light signal from the fist, second and third light-receiving ends (117a, 117b, 117c) of the receiving light conduction path (117) and converting it into an electric signal, and an amplifier circuit (120) for amplifying the electric signal from the light-receiving element (119), and a light-emitting element (121) disposed at the first, second and third light-transmitting ends (118a, 118b, 118c) for converting the electric signal into an optical signal to supply the optical signal to the first, second and third light-transmitting ends (118a, 188b, 118c).

In this embodiment, two connecting ends (113, 114) connecting the optical fibers (11) for optical communication is divided into three systems including a passing-through light conduction path (116) through which light signals in two opposite directions are allowed to pass through between the connecting ends divided into the three systems, a receiving light conduction path (117) having a first light-receiving end (117a) and a second light-receiving end (117b) each receiving a light signal from the connecting ends (113, 114) divided into the three systems, and a transmitting light conduction path (118) having a first light-transmitting end (118a) and a second light-transmitting end (118b) each transmitting a light signal to two of the connecting ends divided into the three systems, and the remaining one connecting end (115) is divided into two systems including the receiving light conduction path (117) also having the third light-receiving end (117c) for receiving a light signal from one of the connecting ends (115) divided into two systems, and the transmitting light conduction path (118) also having a third light-transmitting end (118c) for transmitting a light signal to one of the connecting ends divided into the two systems, and in an energy conversion unit (B), the light signal from the first, second and third light-receiving ends (117a, 117b, 117c) is converted by the light-receiving element (119) into an electric signal and converting this electric signal into the light signal an electric signal after being amplified by an amplifier circuit (120) and further converted it into the light signal by the light-emitting element (121) so that it is supplied from the optical signal to the first, second and third light-transmitting ends (118a, 188b, 118c) of the transmitting light conduction path (118), so that the light signal transmitted through the optical fiber (111) which is a single line can be bidirectionally received and this light signal can be photoelectrically converted into an electric signal. Also, various electric signal can be bidirectionally transmitted as a light signal converted from an electric signal. Moreover, one part of the light signal can be transmitted through the passing-through light conduction path (115) to the next station. Also, similarly, the light signal transmitted within the optical fiber (112) which is a single line can be received and various electric signals can be transmitted as the light signals after they are electro-optical convertion.

BRIEF DESCRIPTION OF THE DRAWINGS

The present invention will become more readily apparent from the following detailed description of the preferred embodiments of the present invention taken in conjunction with the accompanying drawings, in which:

FIG. 2 is a schematic diagram illustrating the conventional optical transmission system;

FIG. 8 is a sectional view showing the connecting end portions of the dividing light conduction path of the communication node shown in FIG. 7;

FIG. 9 is a sectional view showing the additional connection end portions of the communication node shown in FIG. 7;

FIG. 10 is a sectional view showing the connection end portion of divided conduction path when two passing through light conduction paths for the communication node shown in FIG. 7 are provided;

BEST MODES FOR CARRYING OUT THE INVENTION

Figure 3:
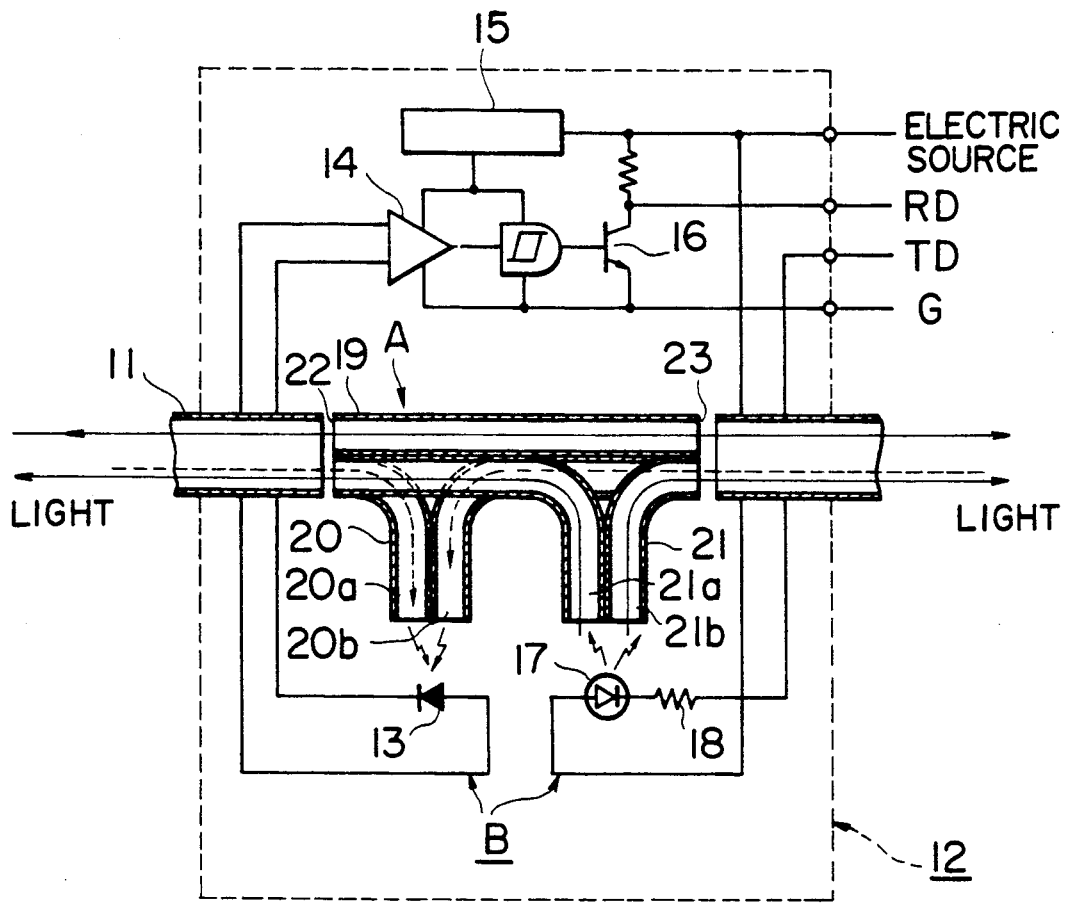
FIG. 3 is a circuit diagram showing the communication node of the optical communication system of one embodiment of the present invention.
Figure 4:
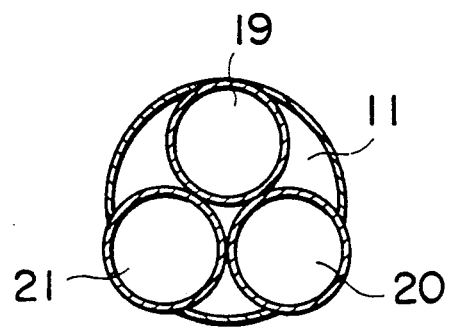
FIG. 4 is a sectional view showing the connection portion of the shunting light conduction path of the communication node shown in FIG. 3.

FIG. 3 is a circuit diagram showing a communication node of an optical communication system of one embodiment of the present invention, and FIG. 4 is a sectional view showing a connecting portion of a shunting light conduction path of the communication node shown in FIG. 3.

In the figures, (11) are sections of optical fibers, and (12) is a communication node which is the communication system of this embodiment. This communication node (12) is composed of a shunting light cnduction path unit (A) and a photo-electric conversion unit (B). (13) is a light receiving element such as a photodiode for converting a light signal into an electric signal, (14) is an amplifier circuit for amplifying the electric signal converted by the light receiving element (13), (15) is a constant voltage source, (16) is an outputting transistor operated by the signal from the amplifier circuit (14). (17) is a light emitting element such as a light emitting diode (LED) for converting various electrical signals into light signals, (18) is a resistor for limiting the electric current to the light emitting element (17). The operation of converting and amplifying the light signal into the electric signal and the operation of converting the electric signal into a light signal are both carried out by the photo-electric converting unit (B) of the communication node (12). (19) is a passing through light conduction path in which a light signal can bidirectionally pass through, thereby serving as if it is a bypass path for the light signal. (20) is a receiving light conduction path for receiving the light signal from either directions and having a first light receiving end (20a) and a second light receiving end (20b). (21) is a light transmitting light conduction path for bidirectionally transmitting the light signals, and having a first light transmitting end (21a) and a second light transmitting end (21b). The above-mentioned passing light conduction path (19), the receiving light conduction path (20) and the transmitting light conduction path (21) together constitute the shunting light conduction path unit (A) of the communication node (12). (22) and (23) are connecting portion with respect to the optical fibers (11) and the shunting light conduction path unit (A). The relationship between the optical fibers (11) and the shunting light conduction path unit (A) is as shown in FIG. 4 from which it is seen that the connecting portion is divided into three systems of passing through light conduction path (19), the receiving light conduction path (20) and the transmission light conduction path (21).

The optical communication system of this embodiment is constructed as above described, and is connected to the neighbouring communication node stations (not shown) by an optical fiber (11) composed of a single filament.

The operation of the communication node (12) which is the optical communication system of this embodiment will now be described.

For example, the description will be made as to the case in which a light signal is transmitted from the station on the left in FIG. 3. One portion of the light signal transmitted within the optical fiber (11) passes through the passing through light conduction path (19) and is transmitted to the next right station through the optical fiber (11) on the opposite side. Also, the other portion passes through the receiving light conduction path (20) and is transmitted to the light receiving element (13) from the first light receiving end (20a). Then, this signal is photo-electrically converted by the light receiving element (13) into an electric signal, which is amplified by the amplifier circuit (14) and is supplied to a signal receiving input terminal RD as a collector output through an output driver transistor (16).

On the other hand, for transmitting light, an electric signal from a signal transmitting output terminal TD causes the light emitting element (17) to emit light. The light signal photo-electrically converted by the light emitting element (17) is transmitted from the first light transmitting end (21a) and the second light transmitting end (21b) of the transmitting light conduction path (21) to the right and left optical fibers (11) through both of the connecting portions (22) and (23). Then, the signal is transmitted to the right and left neighbouring stations.

While the description has been made as to the case where the light signal is transmitted from the left side station in the above embodiment, the operation is similar when the light signal is tansmitted from the opposite side station.

Thus, the optical communication system of this embodiment can receive a light signal from the station on both sides and the light signal can be transmitted to both sides.

Therefore, with this embodiment, there is no need for forming an optical communication loop even with an optical fiber communication formed by a single line, realizing the bidirectional optical communication and enabling the multi-drop bus communication.

Moreover, since one portion of the light signal is allowed to pass through the passing through light conduction path (19) to be bidirectionally transmitted to the station located at the opposite sides, the light signal can be transmitted to the next-located station even when a fault or a power failure occurs at a station. Therefore, the light signal can pass through the station that failed to allow the light signal to be transmitted to the next station.

Therefore, even when the communication system is constructed with a plurality of communication nodes (12) and even when the light is allowed to pass through only one station due to the light loss or the like, the communication system can be controlled in its entirety in so far as the neighbouring two stations do not fail. Particularly, the probability that the neighbouring two stations fail at the same time is extremely small as compared to the probability that only one station fails. Therefore, when the optical communication system of this embodiment is used, the reliability of the communication system can be significantly increased.

Also, since the bidirectional communication is possible in the optical communication system of this embodiment, a communication protocol that is identical to a conventional electric signal multi-drop bus communication through an electric coaxial cable or the like. That is, by installing the communication node (12) in each station of the electric signal communication system such as of the coaxial cable system, the bidirectional optical communication can be easily achieved.

Further, with the above embodiment, the above-discussed operations of shunting of the light signal, taking out of the signal and the transmission of light, etc. can be achieved by the shunt light conduction path unit (A) without the need for using the expensive transparent prisms (2). The shunt light conduction path unit (A) can be formed with optical fibers or the like, so that the system can be made to be inexpensive and easily made small-sized.

Figure 5:
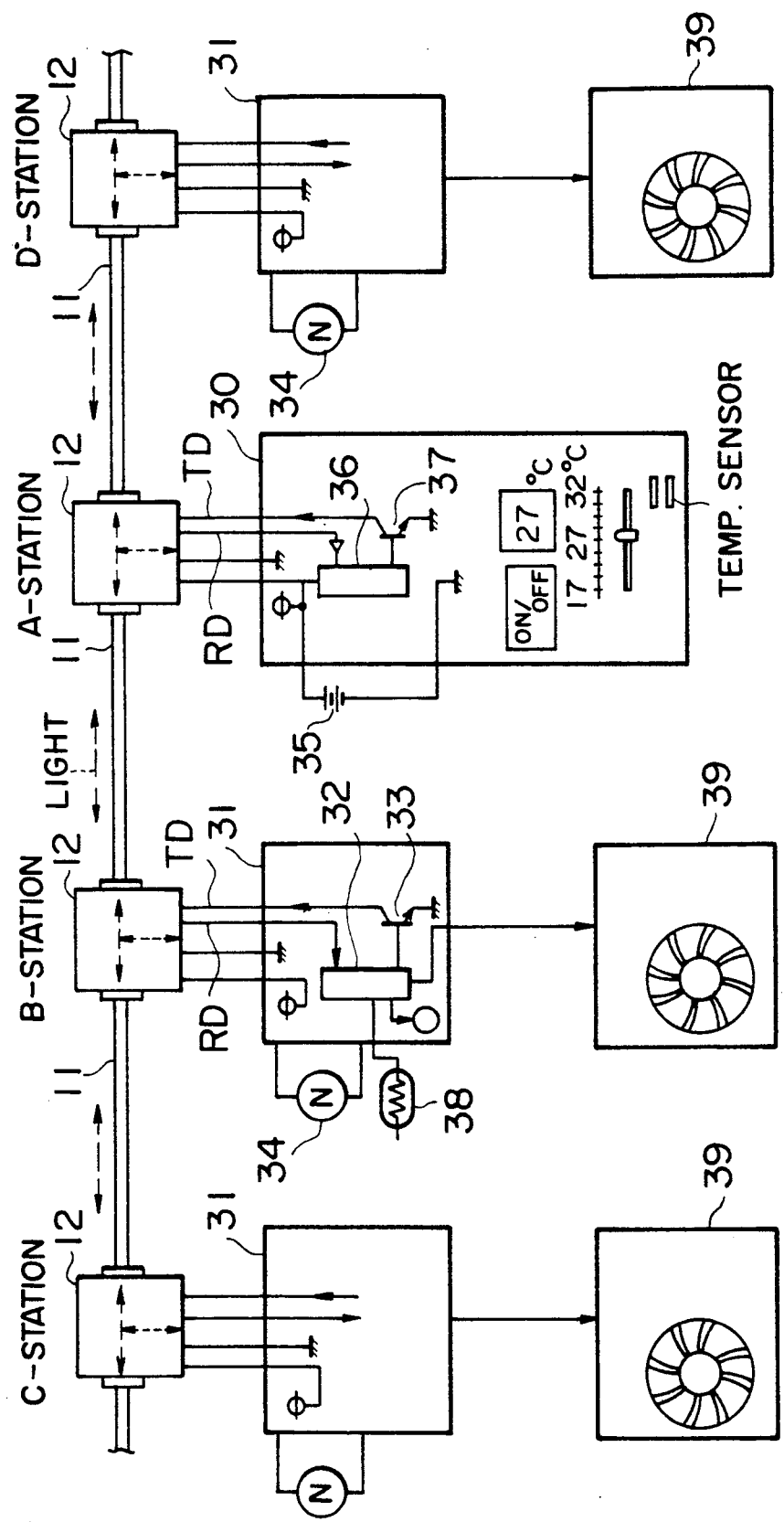
FIG. 5 is a circuit diagram illustrating an air conditioner control system as one example utilizing the optical communication system of the present invention.

The description will now be made as to the application example of the communication system of the optical communication system of this embodiment. FIG. 5 is a circuit diagram showing an air conditioner control system which is one application example of the optical communication system of the present invention. This is a communication system in which a plurality of communication nodes (12) described in conjunction with FIG. 3 are connected by a single optical fiber (11). In the figures, (11) and (12) designate the same or corresponding components described and shown in conjunction with the previously discussed conventional design.

In the figure, (30) is a remote controller for regulating the air conditioner connected to the communication node A (hereinafter referred to as A-station). Connected to the A-station on the left is B-station and then C-station, and D-station is connected to the right of the A-station. (31) are air conditioner indoor units connected to the B-station, the C-station and the D-station and containing microcomputers (32) therein. (33) is a transistor operated by the microcomputer (32) for outputting a transmission signal to the transmission signal output terminal TD of each communication node (12). (34) is an electric source which may be commercial electric source for driving each air-conditioner indoor unit (31), (35) is an electric cell for the remote controller (30), (36) is a microcomputer mounted within the remote controller (30), (37) is a transistor operated by a dignal from the microcomputer (36). (38) is a thermister mouted at the air intake of the air-conditioner indoor unit (31) for detecting room temperature, and (39) is an air-conditioner outdoor unit operating in pair with each of the air-conditioner indoor units (31).

The control system of this air conditioner controls the operation of three air-conditioner indoor units (31) installed in a large room with intervals and connected to the B-station, the C-station and the D-station for example by a single remote controller (30) in accordance with the temperature or the like. The control signal from the remote controller (30) is converted into an optical signal in the A-station and transmitted to the B-station and the D-station on the both sides.

The communication operation in the control system constructed as above described will now be described.

Figure 1A:
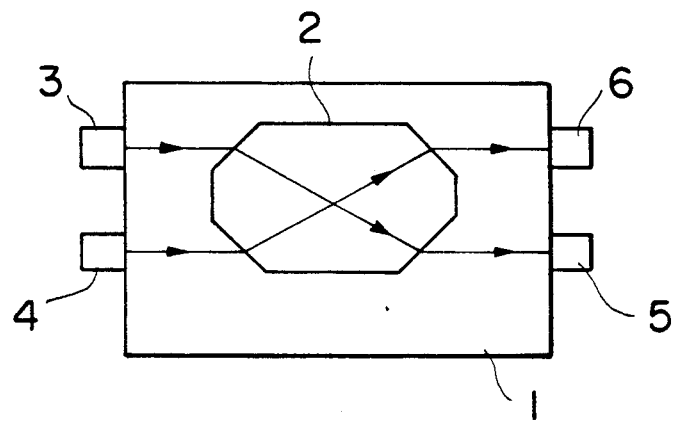
FIG. 1(a) is a schematic plan view of a conventional optical switch used in a conventional optical communication system with the transparent prism inserted within the light path.
Figure 1B:
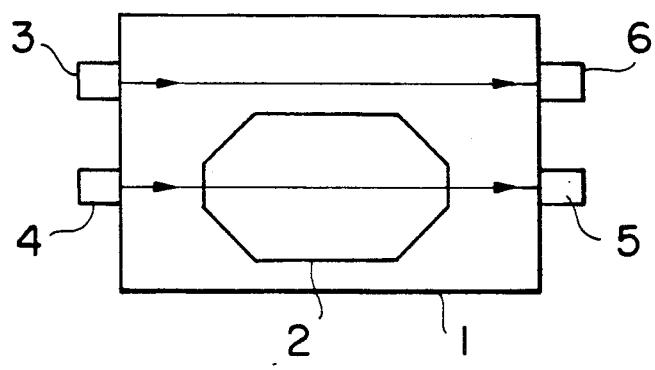
FIG. 1(b) is a schematic plan view of a conventional optical switch shown in FIG. 1(a) with the transparent prism moved out of the light path.

Firstly, the microcomputer (36) operates the transistor (37) according to the temperature signal set by the remote controller (30) to provide an electrical signal at the transmission signal output terminal TD of the communication node (12). This electrical signal is photoelectrically converted by the light emitting element (17) within the communication node (12) as described in conjunction with FIG. 1. Then this signal is transmitted as a light signal from the first transmitting end (21a) and the second transmitting end (21b) to the B-station and the D-station located at the left and right sides of the A-station through the optical fiber (11).

In the communication node (12) of the B-station, this light signal is partially pass through the passing through light conduction path (19) to be immediately transmitted to the C-station next to the B-station. Another part of the light signal is transmitted to the light receiving element (13) from the light receiving end through the receiving light conduction path (20). Then, thesignal is converted into an electrical signal by the light receiving element (13) and amplified by the amplifier circuit (14) to be inputted into the receiving signal input terminal RD. This input signal is received by the microcomputer (32) within the air-conditioner indoor unit (31). The microcomputer (32) generates a pulse signal having a predetermined costant pulse width at a predetermined communication speed in synchorization with the received signal. The microcomputer (32) causes the transistor (33) to operate to generate a transmission signal in the transmission signal output terminal TD of each communication node (12). Thereafter, the transmission signal is photo-electrically converted into a light signal which is transmitted to the C-station and A-station located on the right and left sides of the B-station through the optical fiber (11).

Therefore, the temperature set signal from the remote controller (30) is transmitted also to the C-station similarly to the case of the B-station. Moreover, the signal is transmitted after being amplified in the B-station. Therefore, the same communication information can be successively transmitted no matter how many stations are connected next to the C-station. Since these stations have the passing through light conduction path (19), the communication signal from the A-station can be transmitted to the next station even when the B-station fails or no commercial power (34) is connected.

On the other hand, by connecting the thermister (38) to the input of the microcomputer (32) of the air-conditioner indoor unit (31), the temperature data detected by the thermister (38) can be converted into a light signal to be fed back to the A-station.

In the A-station, the light signal is photoelectrically converted and amplified to be supplied to the microcomputer (36) of the remote controller (30). Then, by comparing the received temperature data and the set temperature data in the remote controller (30), the operation conditions of a fan motor (not shown) or the air conditioner indoor unit (39) can be suitable adjusted to achieve optimum air conditioning.

Also, the temperature detected by the thermister (38) of the B-station can be displayed as 27° C., for example, on the remote controller (30).

Thus, when the optical communication system of this embodiment is applied, by simply connecting the plurality of stations by the single optical fiber (11), various optical communications between the respective stations can be carried out.

In the above embodiment, the communication node (12) has been described as being an integral unit composed of the shunt light conduction path unit (A) and the photoelectric conversion unit (B). However, these shunt light conduction path unit (A) and the photoelectric conversion unit (B) may be separated.

Figure 6:
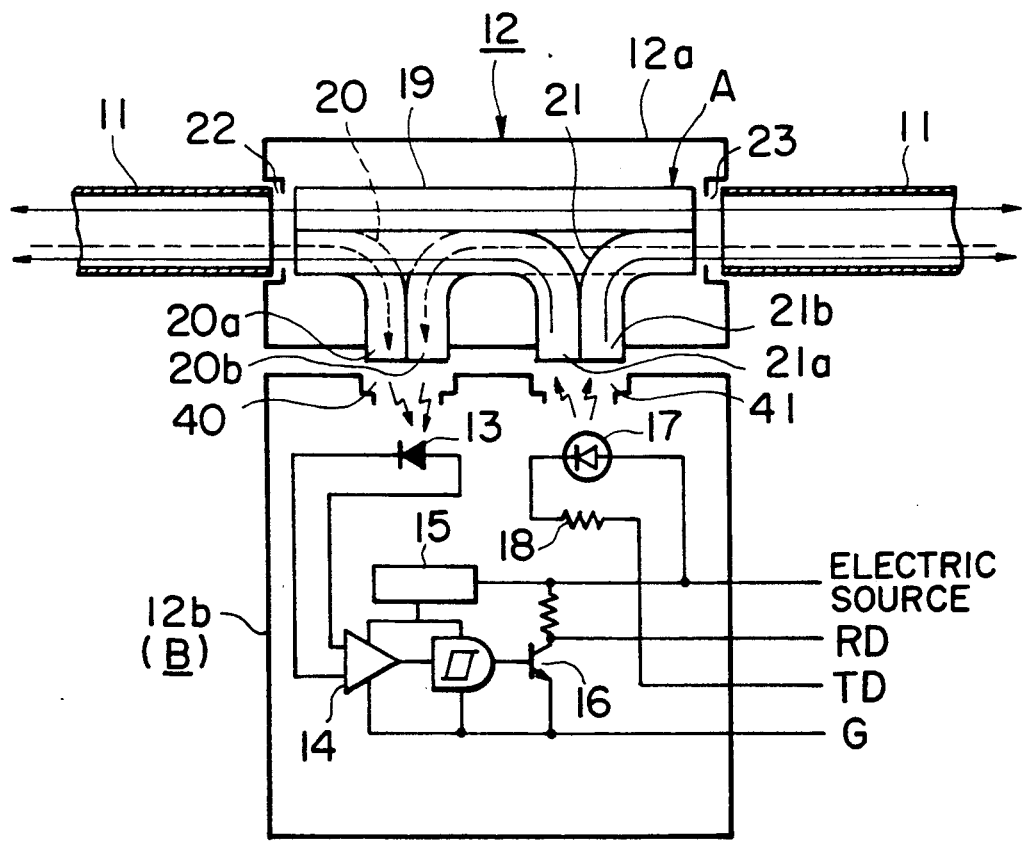
FIG. 6 is a circuit diagram illustrating the communication node of the optical communication apparatus of another embodiment of the prsent invnetion.

FIG. 6 is a circuit diagram showing the communication node of the optical communication system of another embodiment of the present invention. In this embodiment, the shunt light conduction path unit (A) and the photoelectric conversion unit (B) are separated as being a light conduction path unit (12a) and a photoelectric conversion unti (12b). In the figure, the reference numerals (11) to (23) designate the components identical or corresponding to the components described in conjunction with the convention example.

In the figure, (40) is a light receiving connection portion for connecting the first light receiving end (20a) and the second light receiving end (20b) of the light receiving conduction path (20) of the light conduction unit (12a) to the light receiving element (13) of the photoelectric conversion unit (12b). (41) is a light transmission connection portion for connecting the first light transmission end (21a) and the second light transmission end (21b) of the light transmission conduction path (21) of the light conduction path unit (12a) to the light emitting element (17) of the potoelectric conversion unit (12b).

In the communication node (12) of this embodiment, the light conduction path unit (12a) may be connected to the photoelectric conversion unit (12b) so that it has the same construction as that of the communication node (12) of the previous embodiment and therefore the operation of the optical communication is the same. Therefore, the optical communication system of this embodiment can receive the light signal from both right and left directions and can bidirectionally transmit the light signals. Also, since one part of the light signal passes through the passing through conduction light path (19), the same advantageous results as those of the previous embodiment can be obtained.

In particular, when the communication node (12) in which the light conduction path unit (12a) and the photoelectric conversion unit (12b) are separated is used, the degree of freedom of constructing the communication system is increased, allowing the user to suitably select according to the application purpose.

While the optical communication system of the above embodiment has been described as being applied to an air conditioner control system, the application is not limited to that system. For example, since the optical communication has a feature that it is not affected by the electromagnetic noise, it can be widely applied in various communication industries such as information apparatus such as personal computers, the factory communication system such as numerial control machines, or the domestic home automation communication systems.

As has been described, the optical shunt device of the present invention, the section between the connecting ends for being connected to the optical communicating optical fibers is divided into three systems including a passing-through through light conduction path through which light signals in two opposite directions are allowed to pass through between the connecting ends, a receiving light conduction path having a first light-receiving end and a second light-receiving end each receiving a light signal from the connecting ends, and a transmission light conduction path having a first light-transmitting end and a second light-transmitting end each transmitting a light signal to the connecting ends, and the light signal from the first light-receiving end and the second light-receiving end of the receiving light conducting path is converted into an electric signal by the light-receiving element, and this electric signal is amplified by the amplifier circuit and converted into an optical signal by the light-emitting element to supply the optical signal to the first and second light-transmitting ends of the transmitting light conduction path, so that the light signal transmitted through the optical fiber which is a single line can be bidirectionally received and this light signal can be photo-electrically converted into an electric signal. Also, various electric signal can be bidirectionally transmitted as a light signal converted from an electric signal. Moreover, one part of the light signal can be transmitted through the passing-through light conduction path to the next station, so that even upon the fault in that particular station, the light signal can be transmitted to the next station, increasing the reliability of the communication system. Further, the operations of the shunting of the light signal, taking out of the signal and light transmission can be achieved without the need for using the transparent prism, so that the system can be inexpensive and small-sized.

Figure 7:
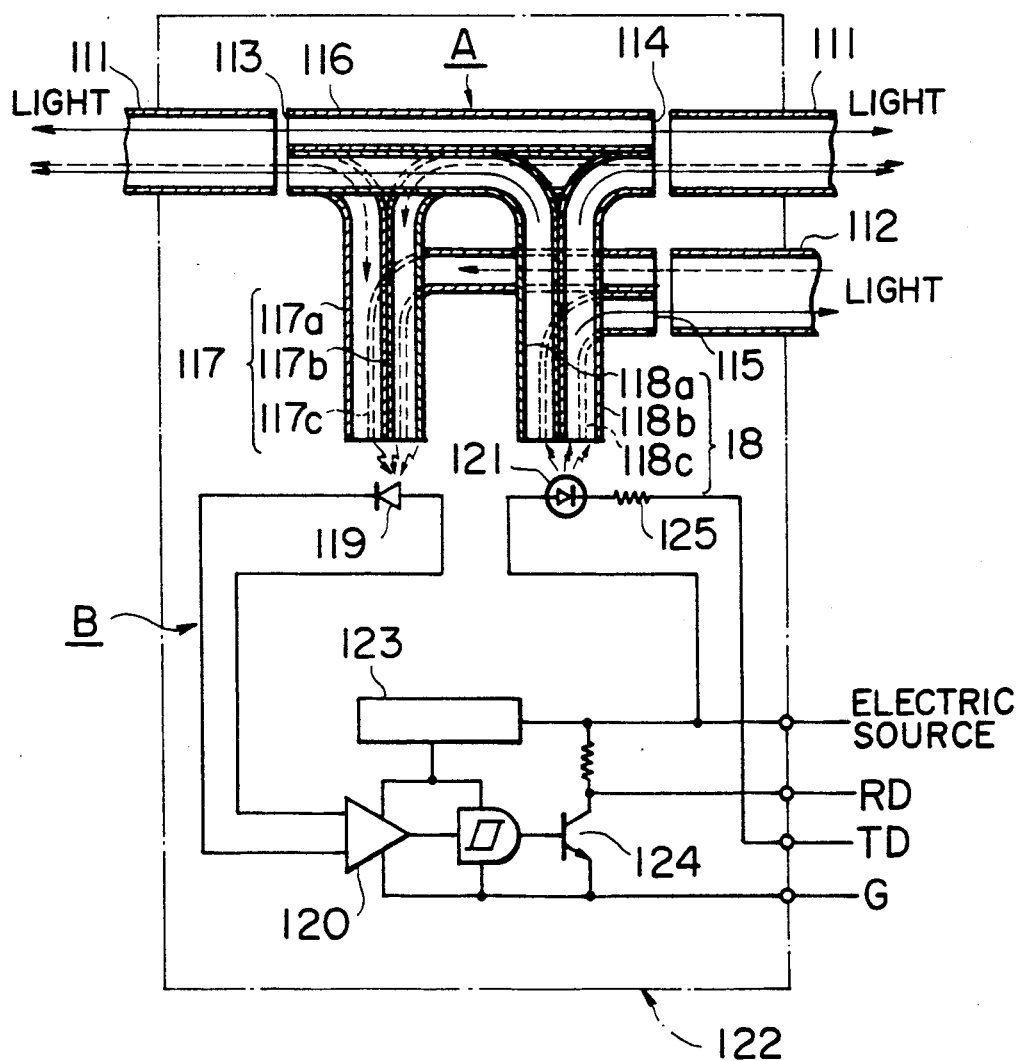
FIG. 7 is a circuit diagram showing the communication node of the optical divider of one embodiment of the present invention.

FIG. 7 is a circuit diagram showing a communication node of an optical communication system of another embodiment of the present invention, and FIG. 8 is a sectional view showing a connecting portion of a shunting light conduction path of the communication node shown in FIG. 7.

In the figures, (111) are sections of optical fibers for transmitting a light signal, (112) is another optical fiber which can be added even when the optical fibers (111) are connected, and (122) is a communication node which is the communication system of this embodiment. This communication node (122) is composed of a shunting light cnduction path unit (A) and an energy conversion unit or a photo-electric conversion unit (B). (119) is a light receiving element such as a photodiode for converting a light signal into an electric signal, (120) is an amplifier circuit for amplifying the electric signal converted by the light receiving element (119), (123) is a constant voltage source, (124) is an outputting transistor operated by the signal from the amplifier circuit (120). (121) is a light emitting element such as a light emitting diode (LED) for converting various electrical signals into light signals, (125) is a resistor for limiting the electric current to the light emitting element (121). The operation of converting and amplifying the light signal into the electric signal and the operation of converting the electric signal into a light signal are both carried out by the photo-electric converting unit (B) of the communication node (122). (116) is a passing through light conduction path in which a light signal can bidirectionally pass through, thereby serving as if it is a bypass path for the light signal. (117) is a receiving light conduction path for receiving the light signal from the optical fiber (112) which can be additionally connected and the light signal in either directions and having a first light receiving end (117a), a second light receiving end (117b) and a third light receiving end (117c). (118) is a light transmitting light conduction path for transmitting the light signals in two opposite directions and to the additionally connectable optical fiber (112) and having a first light transmitting end (118a), a second light transmitting end (118b) and a third light transmitting end (118c). The above-mentioned passing light conduction path (116), the receiving light conduction path (117) and the transmitting light conduction path (118) together constitute the shunting light conduction path unit (A) of the communication node (122).

The reference numerals (113) and (114) are connecting end portions with respect to the optical fibers (111) and the shunting light conduction path unit (A). The relationship between the optical fibers (111) and the shunting light conduction path unit (A) is as shown in FIG. 8 from which it is seen that the connecting portion is divided into three systems of passing through light conduction path (116), the receiving light conduction path (117) and the transmission light conduction path (118). Also, (115) is connecting end portion with respect to the additionally connectable optical fibers (112) and the shunting light conduction path unit (A). The relationship between the additionally connectable optical fibers (112) and the shunting light conduction path unit (A) is as shown in FIG. 9 from which it is seen that the connecting portion (115) is divided into two systems of the receiving light conduction path (117) and the transmission light conduction path (118).

The optical communication system of this embodiment is constructed as above described, and is connected to the neighbouring communication node stations (not shown) by the optical fiber (111) composed of a single filament, and also is connected to the additional, third communication noide station (not shown) by the optical fiber (112) composed of a single filament.

The operation of the communication node (122) which is the optical shunt apparatus of this embodiment will now be described.

For example, the description will be made as to the case in which a light signal is transmitted from the station on the left in FIG. 7. One portion of the light signal transmitted within the optical fiber (111) passes through the passing through light conduction path (116) and is transmitted to the next right station through the optical fiber (111) on the opposite side. Also, the other portion passes through the receiving light conduction path (117) and is transmitted to the light receiving element (119) from the first light receiving end (117a). Then, this signal is photo-electrically converted by the light receiving element (19) into an electric signal, which is amplified by the amplifier circuit (120) and is supplied to a signal receiving input terminal RD as a collector output through an output driver transistor (124).

On the other hand, for transmitting light, an electric signal from a signal transmitting output terminal TD causes the light emitting element (121) to emit light. The light signal photo-electrically converted by the light emitting element (121) is transmitted from the first light transmitting end (118a) and the second light transmitting end (118b) of the transmitting light conduction path (118) to the right and left optical fibers (111) through both of the connecting portions (113) and (114), and also to the optical fiber (112) connected to the third communication node (not shown) from the third light transmitting end (118c). Then, the signal is transmitted to the right and left neighbouring stations.

While the description has been made as to the case where the light signal is transmitted from the left side station in the above embodiment, the operation is similar when the light signal is tansmitted from the opposite side station.

The description will now be made as to the case where a light signal is transmitted from the third station connected to the additionally connectable optical fiber (112).

The light signal transmitted through the optical fiber (112) passes through the receiving light conduction path (117) and is transmitted from the third light receiving end (117c) to the receiving signal input terminal RD through the light receiving element (119).

On the other hand, when transmitting, the signal is transmitted to the stations positioned right and left side as well as the third station.

Thus, the optical shunt device of this embodiment can receive light signals from the stations on both sides as well as the third station and the light signal can be transmitted to both sides and to the third station.

Therefore, with this embodiment, there is no need for forming an optical communication loop even with an optical fiber communication formed by a single line, realizing the bidirectional optical communication and enabling the multi-drop bus communication.

Further, since the connection can be established also to the third station by the additionally connectable optical fiber, a system communication in the shape of a tree is not impossible.

Moreover, with the multi-drop bus communication by the optical shunt device of the embodiment of the present invention, since one portion of the light signal is allowed to pass through the passing through light conduction path (116) to be bidirectionally transmitted to the station located at the opposite sides, the light signal can be transmitted to the next-located station even when a fault or a power failure occurs at a station. Therefore, the light signal can pass through the station that failed to allow the light signal to be transmitted to the next station, and when a fault occurs in either of the stations that station can be passed through so that the light signal can be safely transmitted to the next station.

Therefore, even when the communication system is constructed with a plurality of communication nodes (122) and even when the light is allowed to pass through only one station due to the light loss or the like, the communication system can be controlled in its entirety in so far as the neighbouring two stations do not fail.

Also, when the distance between the communication nodes (122) is large and the light losses of the passing light is large, as shown in FIG. 10, the connection end portion between the optical fibers (111) and the shunt conduction light path unit (A), may be divided into four systems, two of which being the passing through light conduction path (116), one being the receiving light conduction path (117) and the last one being the transmitting light conduction path (118), thereby to increase the light energy of the passing-through light signal, ensuring that the light signal is transmitted to the next station.

Particularly, the probability that the neighbouring two stations fail at the same time is extremely small as compared to the probability that only one station fails. Therefore, when the optical communication system of this embodiment is used, the reliability of the communication system can be significantly increased.

Also, since the bidirectional communication is possible in the optical shunt device of this embodiment, a communication protocol that is identical to a conventional electric signal multi-drop bus communication through an electric coaxial cable or the like. That is, by installing the communication node (122) in each station of the electric signal communication system such as of the coaxial cable system, the bidirectional optical communication can be easily achieved.

Further, with the above embodiment, the above-discussed operations of shunting of the light signal, taking out of the signal and the transmission of light, etc. can be achieved by the shunt light conduction path unit (A) without the need for using the expensive transparent prisms (2). The shunt light conduction path unit (A) can be formed with optical fibers or the like, so that the system can be made to be inexpensive and easily made small-sized.

Figure 11:
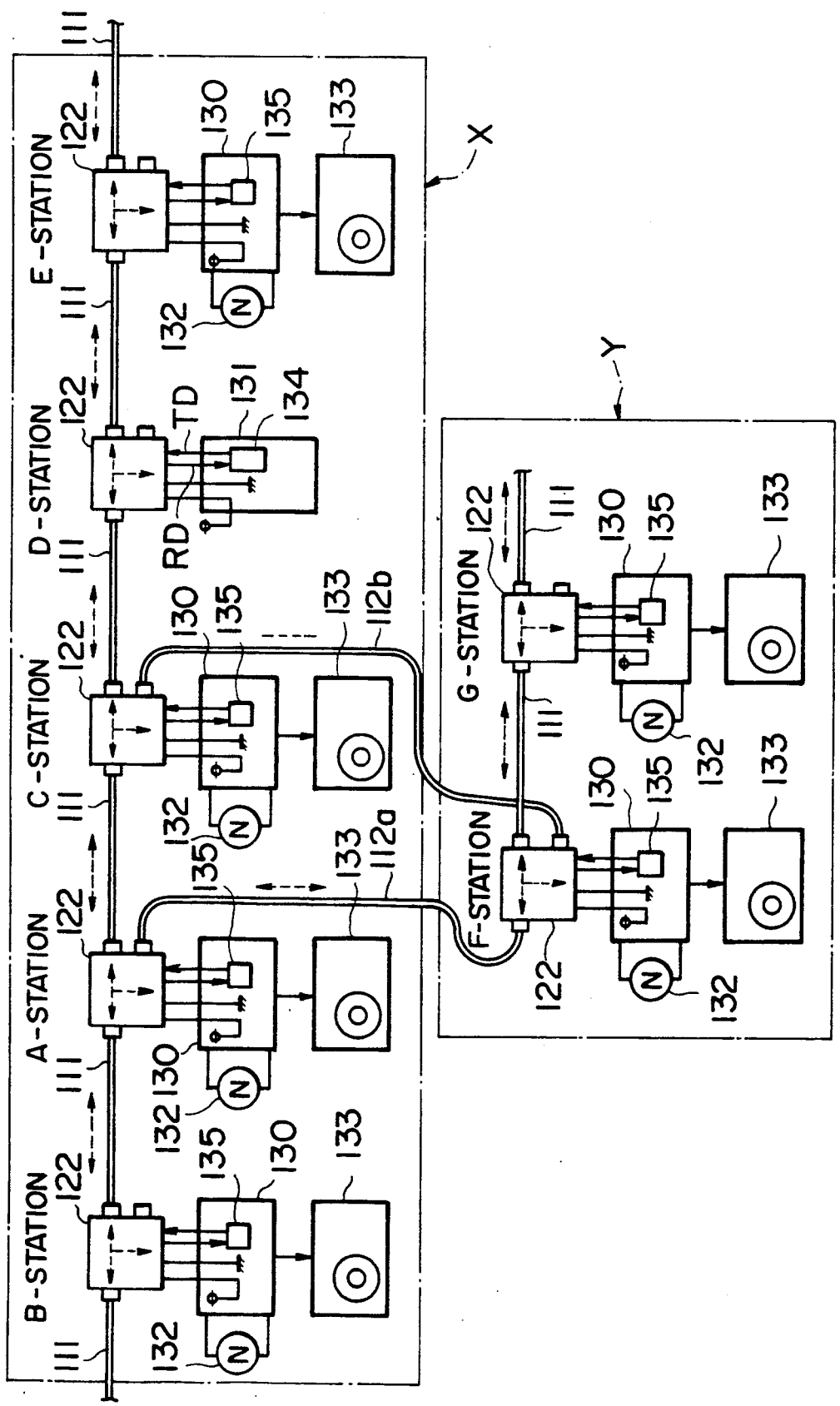
FIG. 11 is a schematic block diagram illustrating an air conditioner control system which is an example of usage of the optical shunt the embodiment of the present invention.

The description will now be made as to the application example of the communication system of the optical shunt device of this embodiment. FIG. 11 is a circuit diagram showing an air conditioner control system which is one application example of the optical shunt device of the present invention. This is a tree-shaped communication system in which the third station is connected by a single optical fiber (112a) to a communication system (X) in which a plurality of communication nodes (122) described in conjunction with FIG. 7 are connected by a single optical fiber (111).

In the figure, (130) is a remote controller for regulating the air conditioner connected to the communication node A (hereinafter referred to as A-station). Connected to the A-station on the left is B-station and the C-station, D-station and E-station are connected to the right of the A-station to constitute the communication system (X). Also, F-station and G-station constitute a communication system (Y). It is seen that the communication systems (X) and (Y) are generally tree-type communication systems in which the F-station is additionally connected to the A-station, and the F-station is additionally connected to the G-station. (131) are remote controllers for the air conditioning temperature controllers each connected to the D-station. (132) is an electric source which may be commercial electric source for driving each air-conditioner indoor unit (130), and (133) is an air-conditioner outdoor unit operating in pair with each of the air-conditioner indoor units (130). (134) is a microcomputer contained within the remote controller (131), and (135) is a microcomputer contained within the air conditioner indoor unit (130).

The control system of this air conditioner is the one in which the system (X) which controls the operation of four air-conditioner indoor units (130) installed in a large room with intervals therebetween and connected to the A-station, the B-station, the C-station, the D-station and the E-station, for example, by a single remote controller (131) in accordance with the temperature or the like has additionally connected thereto the system (Y) composed of the air conditioner indoor unit (130) connected to the F-station and the G-station so that the operation of the system can be controlled with a single remote controller (131). The control signal from the remote controller (131) is converted into an optical signal in the D-station and transmitted to the A-station, the B-station, the D-station and the E-station as well as the additionally connected F-station and the G-station.

The communication operation in the control system constructed as above described will now be described.

Firstly, the microcomputer (134) operates according to the temperature signal set by the remote controller (131) to provide an electrical signal at the transmission signal output terminal TD.

This signal is photo-electrically converted by the light emitting element (121) within the communication node (122) as described in conjunction with FIG. 7. Then this signal is transmitted as a light signal from the first transmitting end (118a), the second transmitting end (118b) and the third transmitting end (118c) (not used) to the C-station and the E-station located at the left and right sides of the D-station through the optical fiber (111).

In the communication node (122) of the C-station, this light signal is partially passed through the passing through light conduction path (116) to be immediately tranmitted to the A-station next to the C-station. Another part of the light signal is transmitted to the light receiving element (119) from the light receiving end through the receiving light conduction path (117). Then, the signal is converted into an electrical signal by the light receiving element (119) and amplified by the amplifier circuit (120) to be inputted into the receiving signal input terminal RD. This input signal is received by the microcomputer (135) within the air-conditioner indoor unit (130). The microcomputer (135) generates a pulse signal having a predetermined constant pulse width at a predetermined communication speed in synchorization with the received signal. The microcomputer (135) generates a transmission signal in the transmission signal output terminal TD of each communication node (122). Thereafter, the transmission signal is photo-electrically converted into a light signal which is transmitted to the A-station and D-station located on the right and left sides of the C-station through the optical fiber (111) as well as to the F-station through the additionally connectable optical fiber (112b).

Therefore, the temperature set signal from the remote controller (131) is transmitted also to the A-station similarly to the case of the C-station. Moreover, the signal is transmitted after being amplified in the cB-station. Therefore, the same communication information can be successively transmitted no matter how many stations are connected next to the A-station. Also, this is also true when the station is located at the right side of the remote controller (D-station).

Since these stations have the passing through light conduction path (116), the communication signal from the C-station can be transmitted to the next station even when the D-station fails or no commercial power (132) is connected.

On the other hand, the F-station, to which the light signal is transmitted from the C-station through the additional connection optical fiber (112b), can transmit the same communication information to the next right subsequent stations following the G-station in the same manner as previously described.

While the signal transmission from the C-station to the F-station is carried out from the additional connection end portion (15), the passing through light conduction path (16) is not provided with respect to the signal from the D-station (or A-station), so that no information is transmitted to the F-station when the C-station fails. Therefore, the stations other than the C-station, for example, the A-station and the F-station are connected so that the communication information can be transmitted to the F-station even when a falut occurs in the C-station. Thus, for the similar reason that the communication can be carried out through the passing light conduction path 8116) so far as the neighbouring two stations do not fail, the communication information can be transmitted to the F-station except when the C-station connected to the F-station and the station other than the C-station, such as the A-station, are concurrently disabled to transmit the light signal.

As described above, in the communication node (122) of this embodiment, so far as two neighbouring stations are not concurrently failed, the tree-configured communication system other than the failed station can be controlled in its entirety even when one station is disabled due to a falut or the like. Also, when it is desired to add a remote controller (not shown) in addition to the D-station, this addition can be easily achieved by connecting the controller to the additional connecting portion (115) of the E-station through an optical fiber.

While the optical communication system of the above embodiment has been described as being applied to an air conditioner control system, the application is not limited to that system. For example, since the optical communication has a feature that it is not affected by the electromagnetic noise, it can be widely applied in various communication industries such as information apparatus such as personal computers, the factory communication system such as numerial control machines, or the domestic home automation communication systems.

Figure 12:
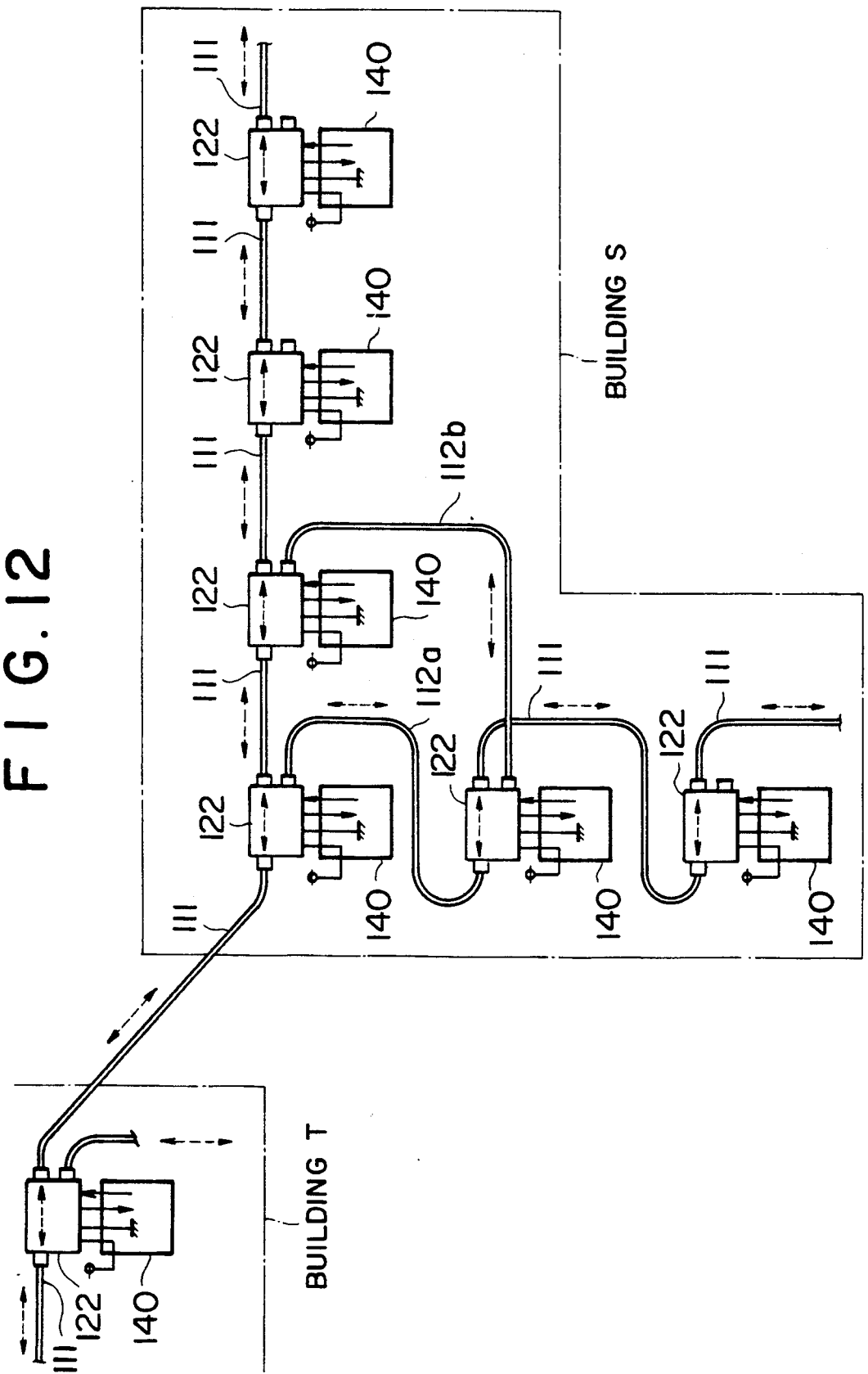
FIG. 12 is a schematic block diagram illustrating a control system of the data processing apparatus such as an information device such as a personal computer which is another exampler of usage of the embodiment of the present invention.

FIG. 12 is a block diagram of one example of a control system for an information apparatus such as a personal computer which is another embodiment of the present application. In the figures, the same reference numerals as those used in FIGS. 7 to 11 designate identical or corresponding components of the previous embodiments, so that only the differences from the embodiment shown in FIG. 11 will be discussed with the descriptions of these components omitted.

In this control system, a building S and a building T in which a network constituted by information apparatus such as personal computers is incorporated are connected by the optical communication lines to construct one system. In each buildings S and T, an information apparatus (140) such as a personal computer is connected to the communication node (122) of this embodiment, thereby constituting the communication system. By connecting the above two systems to the previously described additional connectable end portion (115), the need for the connection by the terminals of the buildings S and T is eliminated, and one communication system including the buildings S and T can be constructed by connecting any commuciation nodes (122) that can be most easily connected with the shortest distance between the buildings S and T.

For example, when it is desired to connect the communication system within the L-shaped building S and the communication system within the building T adjacent to the building S and located at the bent portion of the "L" of the building S, any communication node (122) within the building T is connected to the communication node (122) located close to the corner of the "L" within the building S, and any two stations within each of the buildings S and T are bypassed by the additionally connectable optical fiber (112a), whereby the communication system is obtained in which the buildings S and T are integrally connected by the light conduction path (116) which allows the signal to pass through and by the additionally connectable optical fiber (112b) and in which the information communication can be achieved except for the failed station even when the communication node (122) directly connecting the buildings S and T is failed and disabled to transmit information.

Also, according to the combination of the optical shunt devices of this embodiment, an unlimited optical connection communication of the multi drop bus system of the tree configuration can be realized.

As has been described, according to the optical shunt device of the present invention, shunt light conduction path unit connecting the optical fibers for optical communication is divided into three systems including a passing-through light conduction path through which light signals are allowed to pass through, a receiving light conduction path having a first light-receiving end and a second light-receiving end, and a transmitting light conduction path having a first light-transmitting end and a second light-transmitting end, and an additionally connectable end portion is divided into two systems including the receiving light conduction path having a third light-receiving end and a transmitting light conduction path also having a third light-transmitting end, and in an energy conversion unit, the light signal from the first, second and third light-receiving ends is converted by the light-receiving element into an electric signal and converting this electric signal into the light signal an electric signal after being amplified by an amplifier circuit and further converted it into the light signal by the light-emitting element so that it is supplied from the optical signal to the first, second and third light-transmitting ends of the transmitting light conduction path, so that the light signal transmitted through the optical fiber which is an additionally connectable single line can be bidirectionally received and this light signal can be photo-electrically converted into an electric signal. Also, various electric signal can be transmitted bidirectionally and to an additionally connectable end portion as a light signal converted from an electric signal, so that there is no need for forming an optical communication loop and a single line bidirectional optical communication can be achieved with the tree-configured communication mode. Moreover, in the multi-drop bus mode, one part of the light signal can be transmitted through the passing-through light conduction path to the next station, and in the tree-configured communication mode, by additionally connecting two optical fibers, the light signal can be transmitted to the next station even when a fault occurs in that particular station, increasing the reliability of the communication system.

Further, the operation of the shunting of the light signal, taking out of the signal, transmission of light and the like can be achieved without the need for using the transparent prism, enabling the device to become very inexpensive and small-sized.

We claim:

1. An optical shunt device in which a pair of connecting ends for being connected to optical communication fiber sections are divided into three systems;

the first of said three systems being a passing-through light conduction path through which light signals in two opposite directions are allowed to pass through between said connecting ends;

the second of said three systems being a receiving light conduction path having a first light-receiving end and a second light-receiving end each receiving a light signal from said connecting ends; and a third light system having a first light-transmitting end and a second light-transmitting end each transmitting a light signal to said connecting ends; and a photo-electric conversion unit including:

a light-receiving element disposed at said first and second light-receiving ends for receiving a light signal from said first light-receiving end and said second light-receiving end of said second light system and converting it into an electric signal;

an amplifier circuit for amplifying the electric signal from said light-receiving element; and a light-emitting element disposed at said first and second light-transmitting ends for converting said electric signal into an optical signal to supply said optical signal to said first and second light-transmitting ends.

2. An optical shunt device having three connecting ends including a pair of connecting ends divided into three light conduction systems, and one connecting end divided into two light conduction systems, for being connected to optical communication fiber sections; comprising:

a passing-through light conduction path through which light signals in two opposite directions are allowed to pass through between said connecting ends divided into said three systems;

a receiving light conduction path having a first light-receiving end and a second light-receiving end each receiving a light signal from said connecting ends divided into said three systems, said receiving light conduction path also having a third light-receiving end for receiving a light signal from one of said connecting ends divided into two systems;

a transmitting light conduction path having a first light-transmitting end and a second light-transmitting end each transmitting a light signal to two of said connecting ends divided into said three systems, said transmitting light conduction path also having a third light-transmitting end for transmitting a light signal to one of said connecting ends divided into said two systems; and an energy conversion unit including:

a light-receiving element disposed at said first, second and third light-receiving ends for receiving a light signal from said fist, second and third light-receiving ends of said receiving light conduction path and converting it into an electric signal;

an amplifier circuit for amplifying the electric signal from said light-receiving element; and a light-emitting element disposed at said first, second and third light-transmitting ends for converting said electric signal into an optical signal to supply said optical signal to said first, second and third light-transmitting ends.

3. An optical shunt device for connecting optical fiber sections, comprisig a light path unit and a photoelectric conversion unit;

said light path unit comprising:

a pair of connecting ends adapted to be optically connected between the optical fiber sections;

a first light path extending between said connecting ends and allowing a light signal to pass through in two directions between the optical fiber sections;

a second light path having a first light-receiving end and a second light-receiving end each receiving a light signal from said connecting ends; and a third light path having a first light-transmitting end and a second light-transmitting end each transmitting a light signal to said connecting ends; and said photo-electric conversion unit comprising:

a light-receiving element disposed at said first and second light-receiving ends for receiving a light signal from said fist light-receiving end and said second light-receiving end of said second light path and converting it into an electric signal;

an amplifier circuit for amplifying the electric signal from said light-receiving element; and a light-emitting element disposed at said first and second light-transmitting ends for converting said electric signal into an optical signal to supply said optical signal to said first and second light-transmitting ends.

* * * * *